Dec. 13, 1949        W. SWIFT        2,491,228
FEEDING MECHANISM FOR REGULATING THE RATE OF FEED
OF MATERIAL FROM ROTARY SUPPLY DRUMS OR THE
LIKE TO WIRE-COILING AND LIKE MACHINES
Filed Oct. 27, 1948
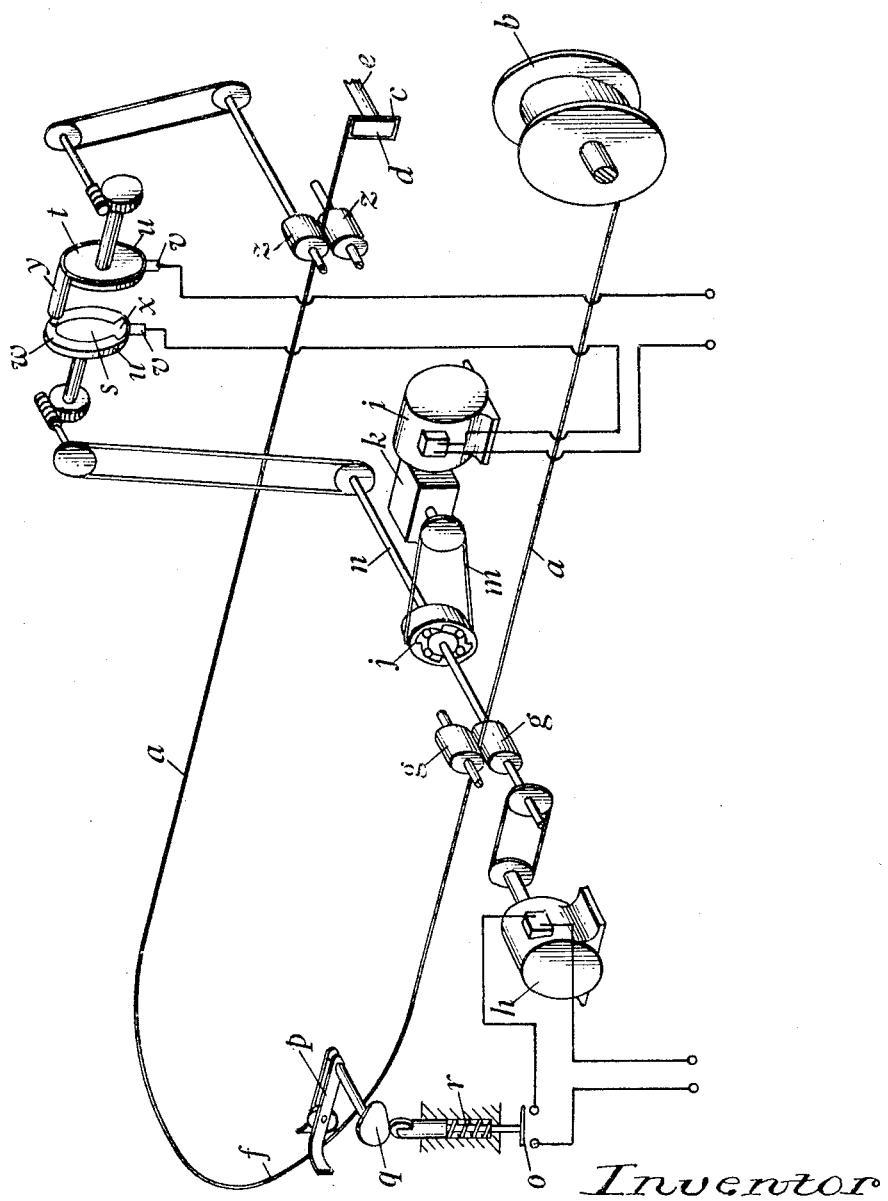
Inventor
W. Swift
By Stewart Downing Herbold
Attys.

Patented Dec. 13, 1949

2,491,228

UNITED STATES PATENT OFFICE 2,491,228

FEEDING MECHANISM FOR REGULATING THE RATE OF FEED OF MATERIAL FROM ROTARY SUPPLY DRUMS OR THE LIKE TO WIRE-COILING AND LIKE MACHINES

William Swift, Sutton Coldfield, England, assignor to Joseph Lucas Limited, Birmingham, England Application October 27, 1948, Serial No. 56,783
In Great Britain November 5, 1947

2 Claims. (Cl. 140—129)

In machines for winding the field, or armature coils of electric dynamos and motors, and for other analogous purposes, the supply of wire, ribbon, or like material is carried on a rotatable drum or the like. Sometimes the winding machine (herein generically referred to as a wire-coiling machine), as a consequence of the nature of the operations to be performed by it, does not draw the material from the drum at a uniform rate, and as a result of the drum being free to rotate under its own momentum when the portion of the material entering the machine is moving at a relatively slow rate, the free portion of material between the drum and the machine may become inconveniently long and thereby cause risk of entanglement. On the other hand if the rate of consumption is momentarily higher than the feed rate the material may be subject to a snatch due to the inertia of the drum.

The object of the present invention is to provide improved means for feeding the material to the machine from a freely rotatable drum or the like.

The invention comprises the combination of a pair of feed rollers, a pair of electric motors adapted to actuate the feed rollers at different relative speeds, a unidirectional clutch between the feed rollers and the motor which actuates them at the slower speed, a switch operable by the material for controlling the other motor, and a two-part rotary switch for controlling the first mentioned motor, the parts of the rotary switch being responsive to the motion of different portions of the material.

The accompanying drawing illustrates diagrammatically one embodiment of the invention for winding the field, or armature coils of an electric dynamo or motor.

Referring to the drawing, the supply of wire, ribbon or like material $a$ to be wound is carried on a rotary drum $b$ situated at any convenient position adjacent to the machine. The term "drum" is herein used to include any freely rotatable carrier for the material. In this example the machine is required to wind coils $c$ of rectangular or other non-circular form on a former $d$ carried by a spindle $e$, the latter being rotated by the machine and its movements controlled in any usual or other appropriate manner. The relative positions of the drum and machine are such as will allow a bight or loop $f$ of free material of convenient length to lie between them. Adjacent to the drum a pair of feed rollers $g$ are arranged, these serving to grip the material and draw it off the drum at a convenient rate. The rollers are driven by a pair of small electric motors $h$, $i$ connected to one of the rollers. The motor $h$ is such that it can drive the rollers faster than the other $i$, and the latter is connected to the feed rollers through a unidirectional clutch $j$, so that the rollers can be driven at a higher rate by the fast motor $h$ independently of the slow motor $i$. In the example shown the motor $i$ transmits its motion through a speed reduction gear in a box $k$, and a belt $m$, the clutch $j$ being mounted on a spindle $n$ connected to one of the rollers $g$. The normal feeding of the material is effected by the motor $i$, but as the machine utilises the material at a variable or non-uniform rate it is necessary to provide means preventing the occurrence of an undesirable excess or deficiency of free material in the loop $f$. To this end the motor $h$ is controlled by a switch $o$ which is normally open, and which can be closed by a lever $p$ and cam $q$ operable by the material, the switch being held in its open position by a spring $r$. The arrangement is such that if the loop becomes too short it moves the lever in the direction for closing the switch thereby setting the fast motor in motion. The feed rollers are then driven at a faster rate to replenish the loop, and when this has been attained the lever returns under the action of its spring, for opening the switch and stopping the fast motor, the feed being then continued at the normal rate by the motor $i$.

The control of the motor $i$ is effected by a switch consisting of a pair of coaxial rotary parts $s$, $t$. Each is provided with a slip ring $u$ co-operating with a brush $v$, and the slip ring on the part $s$ has associated with it a ring $w$ which is gapped at $x$. The part $t$ carries a brush $y$ which co-operates with the gapped ring $w$. When by relative rotation of the parts $s$, $t$ the brush $y$ comes opposite the gap $x$, the supply of current to the motor $i$ is stopped. The part $t$ is rotated through any convenient gearing from a pair of rollers $z$ in contact with the material at a position adjacent to the machine. The part $s$ is driven through any convenient gearing from the spindle $n$ driven by the motor $i$. When the machine is drawing material from the loop $f$ at a relatively slow rate, such that continued action of the feed rollers $g$ could produce an excess of free material in the loop, the part $s$ of the switch will move faster than the other part $t$ and bring the gap $x$ into coincidence with the brush $y$ on the other part $t$. The motor $i$ then stops and the drawing of material from the drum is discontinued until the brush $y$ leaves the gap $x$ under the action of the switch part *t* and thereby re-starts the motor *i*. If at this stage the movement of the material into the machine is still slower than normal, the motor *i* is again stopped and subsequently re-started as above described, and these actions are repeated until the resumption of the normal rate of motion of the material into the machine, whereupon the motor *i* (after being started) remains in action due to the switch parts *s*, *t* being rotated at the same rate.

It will be seen that when the fast motor *h* is in action the slow motor *i* will be intermittently stopped and restarted due to the switch part *s* being rotated by the fast motor at a faster rate than the switch part *t*, but this is of no consequence as the slow motor is ineffective while the fast motor is in action.

By this invention I am able to effect the feeding of the material from the drum to the machine in a manner which not only obviates the occurrence of an undesirable excess or alternatively a deficiency of free material between the drum and the machine, but which also assists in obtaining a higher rate of output from the machine.

Whilst the invention is primarily intended for use with machines for winding the field or armature coils of electric dynamos and motors, it may be used with other winding machines where the rate of utilisation of the material in the normal action of the machine is variable.

Having thus described my invention what I claim as new and desire to secure by Letters Patent is:

1. A feeding mechanism for a wire-coiling or like machine, and comprising the combination of a pair of feed rollers, a pair of electric motors adapted to actuate the feed rollers at different relative speeds, a unidirectional clutch between the feed rollers and the motor which actuates them at the slower speed, a switch operable by the material for controlling the other motor, and a two-part rotary switch for controlling the first mentioned motor, the parts of the rotary switch being responsive to the motion of different portions of the material.

2. A feeding mechanism for a wire-coiling or like machine, and comprising the combination of a pair of feed rollers, arranged to receive the material to be coiled from a freely rotatable drum, a pair of electric motors adapted to actuate the feed rollers at different relative speeds, a unidirectional clutch between the feed rollers and the motor which drives these rollers at the slower rate, a switch for controlling the other motor and operable by a portion of the material forming a loop between the feed rollers and the machine, a two-part rotary switch for controlling the first mentioned motor, one part of the switch carrying a brush which co-operates with a gapped ring on the other part of the switch, and the two parts being responsive to the motion of different portions of the material.

WILLIAM SWIFT.

REFERENCES CITED

The following references are of record in the file of this patent:

UNITED STATES PATENTS

| Number | Name | Date |
|---|---|---|
| 911,236 | Groebli | Feb. 2, 1909 |
| 1,304,565 | Henderson | May 27, 1919 |
| 1,657,513 | Menzie | Jan. 31, 1928 |
| 1,658,660 | Traver | Feb. 7, 1928 |
| 1,986,724 | Goins | Jan. 1, 1935 |
| 2,002,374 | King | May 21, 1935 |
| 2,277,514 | Elser | Mar. 24, 1942 |
| 2,295,327 | Bendz | Sept. 8, 1942 |
| 2,306,750 | Rendel | Dec. 29, 1942 |
| 2,347,261 | Harrington | Apr. 25, 1944 |